S. H. WOODBURY & W. T. GRAY.
Spool.
No. 217,186.  Patented July 1, 1879.
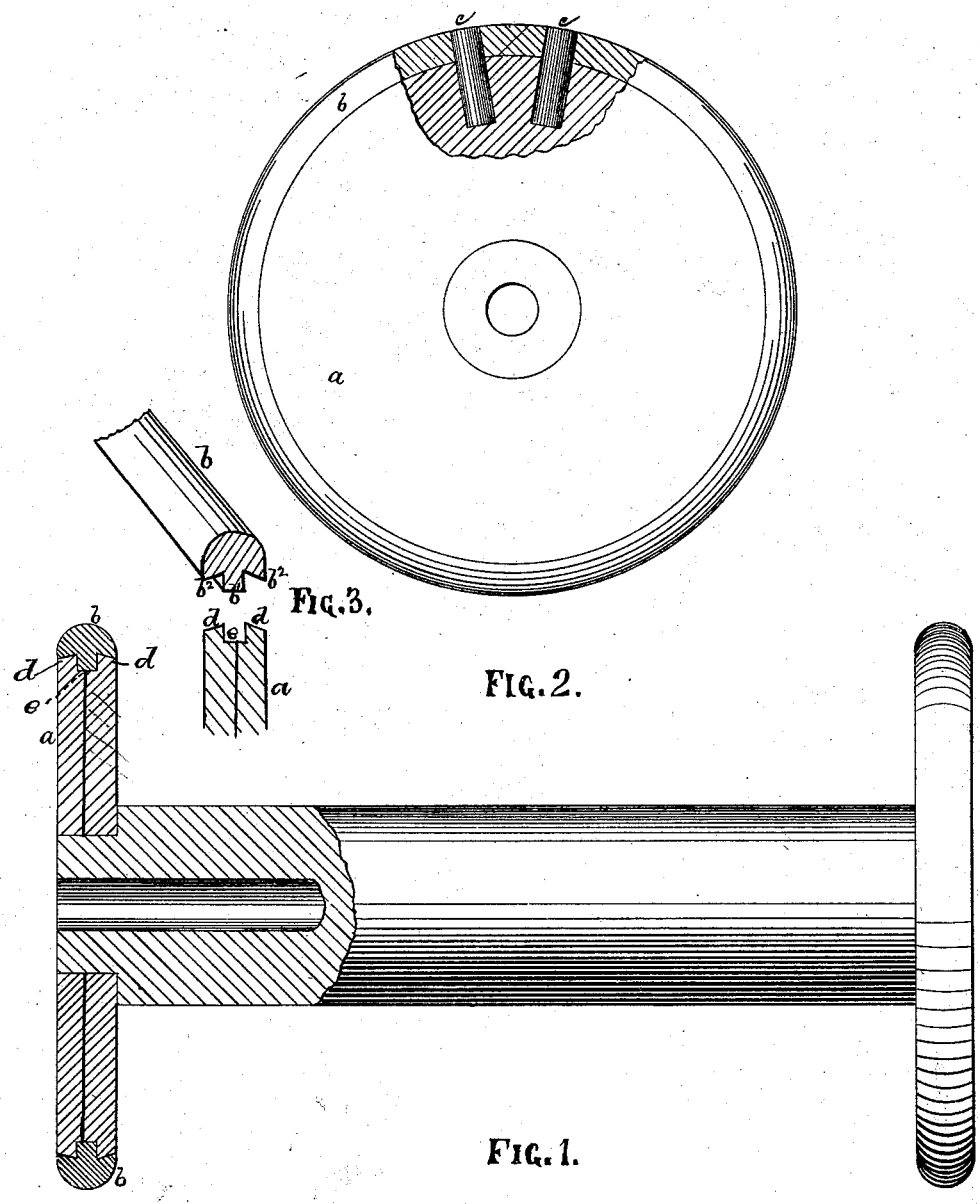

UNITED STATES PATENT OFFICE.

SETH H. WOODBURY AND WILLIAM T. GRAY, OF LYNN, MASSACHUSETTS.

IMPROVEMENT IN SPOOLS.

Specification forming part of Letters Patent No. 217,186, dated July 1, 1879; application filed November 19, 1877.

*To all whom it may concern:*

Be it known that we, SETH H. WOODBURY and WILLIAM T. GRAY, both of Lynn, in the State of Massachusetts, have invented certain Improvements in Spools, of which the following is a specification.

The object of our invention is to so construct the heads of spools as to obviate the danger of splitting or breaking, to which they are subject when made in some of the modes now in use.

The heads of spools are usually constructed of two pieces, the grains of which run at right angles with each other, and these pieces are glued together.

This mode of construction is adopted to prevent warping; but at the same time it renders them particularly liable to split or break.

We make our spools in two pieces, as above stated, and the two pieces are glued together. These heads are then fastened to the cylinder. We then make on the edges or periphery of the heads a bevel and groove. A piece of hard wood, of a length equal to the circumference of the head, (on the under side of which is made a projection and inclined or beveled flanges corresponding to the bevels and groove on the periphery of head,) is next steamed, so that it may be readily bent. Glue is next placed on the under side of this piece or around the periphery of the head, and the piece of steamed wood is then bent circumferentially around the periphery of the head.

To guard against the liability of the bent piece of wood becoming loose where its ends meet, we drive through these ends and into the head a peg or dowel. We next turn the heads of the spool in a lathe in the usual way, and the bent piece of wood forms the edge and a part of the spool.

Referring to the drawings, Figure 1 represents a spool embodying our invention, showing one of the heads in section; and Fig. 2 represents one of those heads with a part broken off, so as to show the method of fastening the ends of the bent piece of wood by means of pegs or dowels. Fig. 3 is a detached sectional view, showing the conformation of the tire and head.

$a$ is the head. $b$ is the bent piece of wood forming the edge of the head, and $c$ $c$ the pegs or dowels. The head $a$ is formed around its periphery with a central groove or slot, $e$, on each side of which the edges are downwardly inclined or beveled, as shown at $d$ $d$, Fig. 3. The under side of the tire $b$, as shown in Fig. 3, is made to correspond in shape to the periphery of the head—that is, with a central tongue or rib, $b^1$, which is received into the slot $e$, and beveled flanges $b^2$ $b^2$, which fit down on and overlap the edges $d$ $d$ of the head.

Our invention will effectually prevent the splitting apart of the two pieces of wood forming the head. The bevels and the tongue and groove bind them firmly together, and a spool is formed which will endure a great amount of wear without slivering or breaking on the edges, which, in ordinary spools, is the source of much annoyance and expense to manufacturers.

Sawed pieces of wood might be employed in the place of the bent wood with same success; but the hardness and toughness of the bent wood make it much more useful for our purpose.

We are aware that spool-heads have been made with circumferential grooves to receive metal in a fused state, to form, when cool and shrunk, a strengthening-band; also, that spool-heads have been strengthened by a band or strip of rawhide wound circumferentially around said head. This, therefore, we lay no claim to; but What we do claim as new, and desire to secure by Letters Patent, is—

A spool or bobbin the heads $a$ thereof being provided with a periphery having a central groove, $e$, beveled edges $d$ $d$, and a wooden tire, $b$, formed with beveled flanges $b^2$ $b^2$ and a central bead or rib, $b^1$, said tire being adapted to fit the periphery of the head and form the outer part thereof, and secured thereto by glue and pins $c$ $c$, as shown and described, for the purposes specified.

SETH H. WOODBURY.
WILLIAM T. GRAY.

Witnesses:
T. F. PENDERGAST,
CHAS. H. DREW.